United States Patent [19]
Moore et al.

[11] Patent Number: 5,934,403
[45] Date of Patent: Aug. 10, 1999

[54] DIRECTIONAL CONTROL INTERLOCK CIRCUIT FOR LOADER/BACKHOES AND LOADERS

[75] Inventors: Byron R. Moore; Chad E. Bement; Michael G. Nahorny, all of Burlington, Iowa

[73] Assignee: Case Corporation, Racine, Wis.

[21] Appl. No.: 09/041,535

[22] Filed: Mar. 12, 1998

[51] Int. Cl.$^6$ .............................. B60L 1/00; F16H 59/00; B60K 41/12; B60K 17/00
[52] U.S. Cl. .............................. 180/336; 477/45; 477/46; 307/9.1; 307/10.1; 74/335
[58] Field of Search .............................. 180/336; 74/335; 307/10.1, 9.1; 414/694, 695; 477/45, 46

[56] References Cited

U.S. PATENT DOCUMENTS

| | | |
|---|---|---|
| 4,243,126 | 1/1981 | Lee et al. . |
| 4,243,127 | 1/1981 | Lee et al. . |
| 4,496,105 | 1/1985 | Fleming et al. . |
| 4,699,021 | 10/1987 | Waddington . |
| 4,846,581 | 7/1989 | Osterlund et al. . |
| 5,036,718 | 8/1991 | Burlgrien ................................. 74/335 |
| 5,174,115 | 12/1992 | Jacobson et al. . |
| 5,233,525 | 8/1993 | Overmann et al. . |
| 5,248,020 | 9/1993 | Kreitzberg . |
| 5,261,288 | 11/1993 | Menig ....................................... 74/335 |
| 5,377,801 | 1/1995 | Stoever . |
| 5,413,452 | 5/1995 | Lech et al. . |
| 5,569,114 | 10/1996 | Matsuda et al. . |
| 5,573,471 | 11/1996 | Shubinsky et al. . |
| 5,611,245 | 3/1997 | McKee . |
| 5,809,441 | 9/1998 | McKee ....................................... 701/51 |

*Primary Examiner*—Lanna Mai
*Assistant Examiner*—Jeff Restifo
*Attorney, Agent, or Firm*—Foley & Lardner

[57] ABSTRACT

A work vehicle having an improved transmission control circuit, that is responsive to a shuttle shift lever and associated switch that generates a forward signal, a reverse signal and a neutral signal, whereby the transmission control circuit engages the transmission in a forward gear ratio on receipt of the forward signal, a reverse gear ratio on receipt of the reverse signal and places the transmission in neutral on receipt of the neutral signal, and further wherein the transmission control circuit further places the transmission in neutral whenever it receives both a forward and neutral signal, or both a reverse and neutral signal.

10 Claims, 3 Drawing Sheets

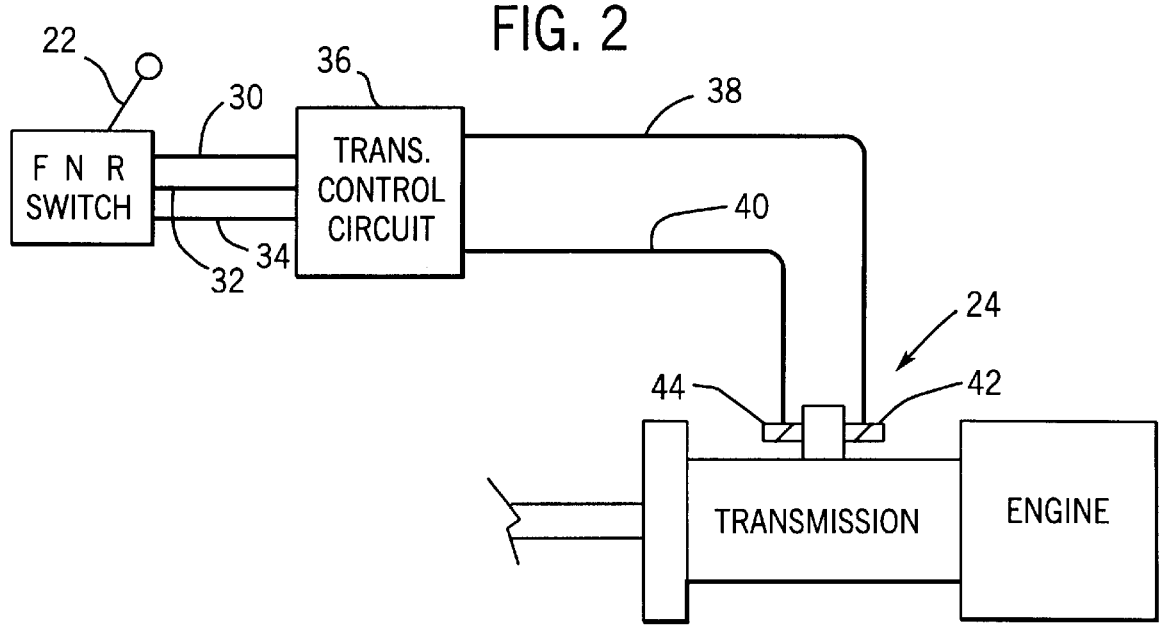

DIRECTIONAL CONTROL INTERLOCK CIRCUIT FOR LOADER/BACKHOES AND LOADERS

FIELD OF THE INVENTION

The invention related generally to work or construction vehicles. More particularly, it relates to control systems for transmissions of work or construction vehicles.

BACKGROUND OF THE INVENTION

Backhoes and front loaders are work vehicles that engage in digging and moving materials around construction or other work sites. As a part of this work, they often drive into piles of material, scoop up a portion of those piles using a front loader or a rear backhoe, then reverse their direction to convey the scooped material to a new location a short distance away. This activity requires the vehicles to frequently change their direction of travel, such that the operator frequently shifts from a forward direction of travel to a reverse direction of travel and vice-versa. In addition, these vehicles are also rapidly and alternatively loaded and unloaded, producing large fluctuating loads. As a result of these job requirements, the vehicles are often equipped with transmissions having torque converters that reduce the potential drive train damage that might appear if manual transmissions were used. In addition to and complementing the torque converter, these vehicles can also include a shuttle shift lever that allows rapid shifting between forward and reverse. The shuttle shift lever typically operates by selectively and alternatively connecting forward and reverse hydraulic circuits on the transmission that place the transmission alternatively in forward and reverse. Since these levers are operated rapidly and frequently, they can on rare occasions simultaneously send out command signals indicative of more than one desired mode of operation, typically signals indicative of a forward shift command and a neutral shift command, or signals indicative of a reverse shift command and a neutral shift command. This can happen, for example, when the operator holds the shuttle shift lever halfway between a forward position and a neutral position or halfway between a reverse position and neutral position. The application of these two pairs of incompatible signals (forward and neutral or reverse and neutral) can leave the vehicle's transmission in an unknown state. It is a goal of the present invention to provide a vehicle having a transmission control circuit that prevents such incompatible signals from leaving the vehicle's transmission in an unknown state.

SUMMARY OF THE PRESENT INVENTION

In accordance with a first embodiment of the invention, an improved transmission control circuit is disclosed in a work vehicle having an engine coupled to a transmission that includes a torque converter and a transmission shiftable into a forward direction by engaging a forward solenoid and a reverse direction by engaging a reverse solenoid, and an operator-actuable shuttle shift lever for generating forward, reverse and neutral signals indicative of a desired forward direction, reverse direction and a neutral transmission condition, respectively, the control circuit including a transmission control circuit configured to engage the forward solenoid in response to the forward solenoid signal, the reverse solenoid in response to the reverse solenoid signal and to generate a neutral transmission condition in response to the neutral signal, and further configured to generate the neutral condition in response to concurrent receipt of both the neutral and the forward signals and the neutral and the reverse signals. On concurrent receipt of the neutral signal and the forward signal, the transmission may generate the neutral condition after a delay of between 3 and 10 seconds. On concurrent receipt of the neutral signal and the reverse signal, the transmission control circuit may generate the neutral condition after a delay of between 3 and 10 seconds. The transmission control circuit may include a shuttle interlock circuit that, on receipt of the neutral signal, interrupts power otherwise supplied to a forward solenoid, or may include a shuttle interlock circuit that, on receipt of the neutral signal, interrupts power otherwise supplied to a reverse solenoid.

In accordance with another arrangement of the invention, an improved work vehicle is provided, including a frame, an engine coupled to the frame, a transmission coupled to the engine engageable at least in forward, reverse and neutral, a plurality of drive wheels coupled to the transmission, a shuttle shift lever having at least a reverse, a forward and a neutral position, a switch responsive to the position of the shuttle shift lever for generating a forward signal, a reverse signal and a neutral signal indicative of the forward, reverse and neutral positions of the shuttle shift lever, and a transmission control circuit coupled to the switch to receive the forward, reverse and neutral signals, and to engage the transmission in forward on receipt of the forward signal, to engage the transmission in reverse on receipt of the reverse signal, and to place the transmission in neutral on receipt of the neutral signal, and also to engage the transmission in neutral on concurrent receipt of the neutral and the forward signals and on concurrent receipt of both the neutral and reverse signals. On concurrent receipt of the neutral signal and the forward signal, the transmission control circuit may place the transmission in neutral after a delay of between 3 and 10 seconds. On concurrent receipt of the neutral signal and the reverse signal, the transmission control circuit places the transmission in neutral after a delay of between 3 and 10 seconds. The transmission control circuit may include a shuttle interlock circuit that, on receipt of the neutral signal, interrupts power otherwise supplied to a forward transmission solenoid. The transmission control circuit may include a shuttle interlock circuit that, on receipt of the neutral signal, interrupts power otherwise supplied to a reverse transmission solenoid.

Other principal features and advantages of the invention will become apparent to those skilled in the art upon review of the following drawings, the detailed description and the appended claims.

BRIEF DESCRIPTION OF THE DRAWINGS

FIG. 2 is a schematic diagram of the transmission control circuit showing its connections to the shuttle shift lever and the transmission;

FIG. 3 is a logic table showing the operation of the transmission control circuit's response to different command signals that may be received from the shuttle shift lever.

Figure 1:
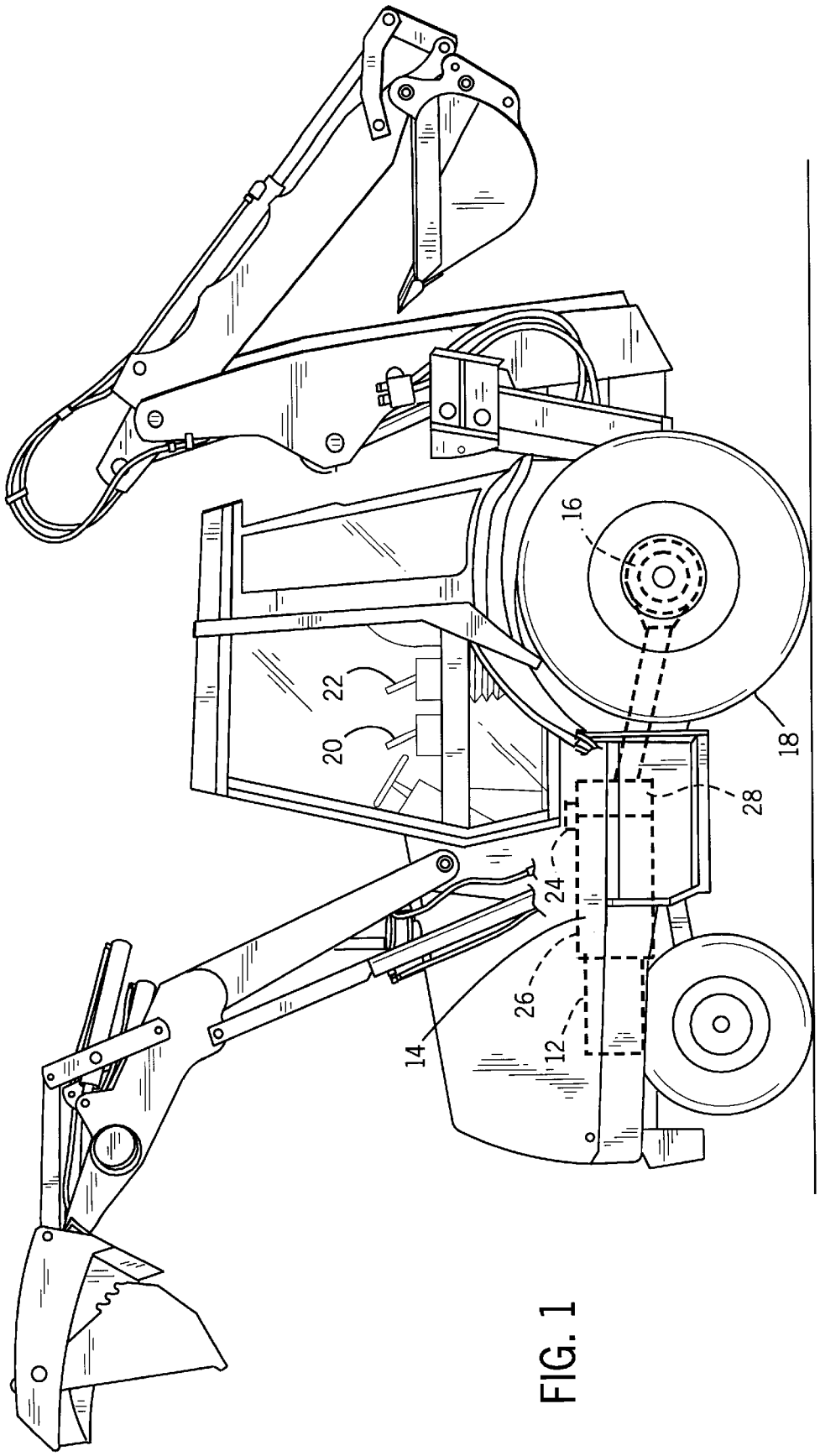
FIG. 1 illustrates a work vehicle and its transmission control circuit.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, work vehicle 10 includes an engine 12 mounted on frame 13 that is coupled to and drives the input shaft of transmission 14. Transmission 14 is coupled to and drives differential 16. Differential 16 is coupled to and drives rear wheels 18 (only one shown). Gear shift lever 20 is mechanically coupled to transmission 14 to selectively and successively shift between a plurality of gear ratios. Shuttle shift lever 22 allows the operator to control forward and reverse solenoid valve 24, that, in turn, selectively engages the transmission in a forward or reverse gear ratio as well as in a neutral condition.

The transmission includes a manual gearbox 26 to which gear shift lever 20 is connected, and a torque converter 28. The operator can place gearbox 26 in a particular gear ratio using gear shift lever 20 when the vehicle is idling and the shuttle shift lever 22 is in neutral. To move forward, the operator must increase the engine speed and move the shuttle shift lever 22 into the forward position. Alternatively, and if the operator wishes the vehicle to travel in reverse, the operator must increase the engine speed and move the shuttle shift lever 22 into the reverse position. Once the vehicle is moving and in gear, the operator can shift from forward to reverse merely by moving the shuttle shift lever 22 from forward, past neutral, to the reverse position. The operator can shift from reverse to forward by moving the shuttle shift lever 22 from reverse, past neutral to the forward position.

The operator need not change the position of gear shift lever 20 or the selected gear ratio of the transmission to transition from forward to reverse and vice-versa. Once the particular gear ratio is selected using the gear shift lever, all further shuttle shifting can occur simply by manipulating the shuttle shift lever.

Referring now to FIG. 2, the shuttle shift lever functions by actuating a switch coupled to shuttle shift lever 22 that in turn generates a forward, a reverse and a neutral signal on forward, reverse and neutral signal lines 30, 32 and 34. Each such signal corresponds to a forward, reverse and neutral position of the shuttle shift lever. These signals are communicated to the transmission control circuit 36 via signal lines 30, 32 and 34 which are connected to transmission control circuit 36. In response to these signals, the transmission control circuit 36 generates a forward solenoid signal on forward solenoid signal line 38, a reverse solenoid signal on reverse solenoid signal line 40. The forward solenoid signal line is coupled to the forward transmission solenoid valve coil 42 to engage the transmission in a forward gear ratio when the forward solenoid signal is applied to the forward transmission solenoid valve. The reverse solenoid signal line is coupled to the reverse transmission solenoid valve coil 44 to place the transmission in a reverse gear ratio when the reverse solenoid signal is generated on the reverse solenoid signal line.

The logic table of FIG. 3 shows how the transmission control circuit operates. In particular, it illustrates the output signals it generates for each combination of input signals. In the table a "1" indicates that a signal is generated, and a "0" indicates that a signal is not generated. Row 1 of the table illustrates the operation of the transmission control circuit 36 when the only signal generated by the shuttle shift lever switch is the neutral signal on the neutral signal line 34 (i.e. "IN" is "1" in Row 1. In this case, the transmission generates neither the forward nor the reverse solenoid signals (i.e. "FS" and "NS" are "0" in Row 1). Similarly, as can be seen in rows 3 and 5 of the table, we see that whenever the neutral signal and either the forward or reverse signals are concurrently generated by the shuttle shift lever switch, the neutral signal overrides the forward or the reverse signals and neither the forward nor the reverse solenoid signals are generated, thereby placing (or keeping) the transmission in neutral. The transmission control circuit 36 can be assembled from well known digital or analog circuits or by any suitably programmed microprocessor or microcontroller.

Figure 4:
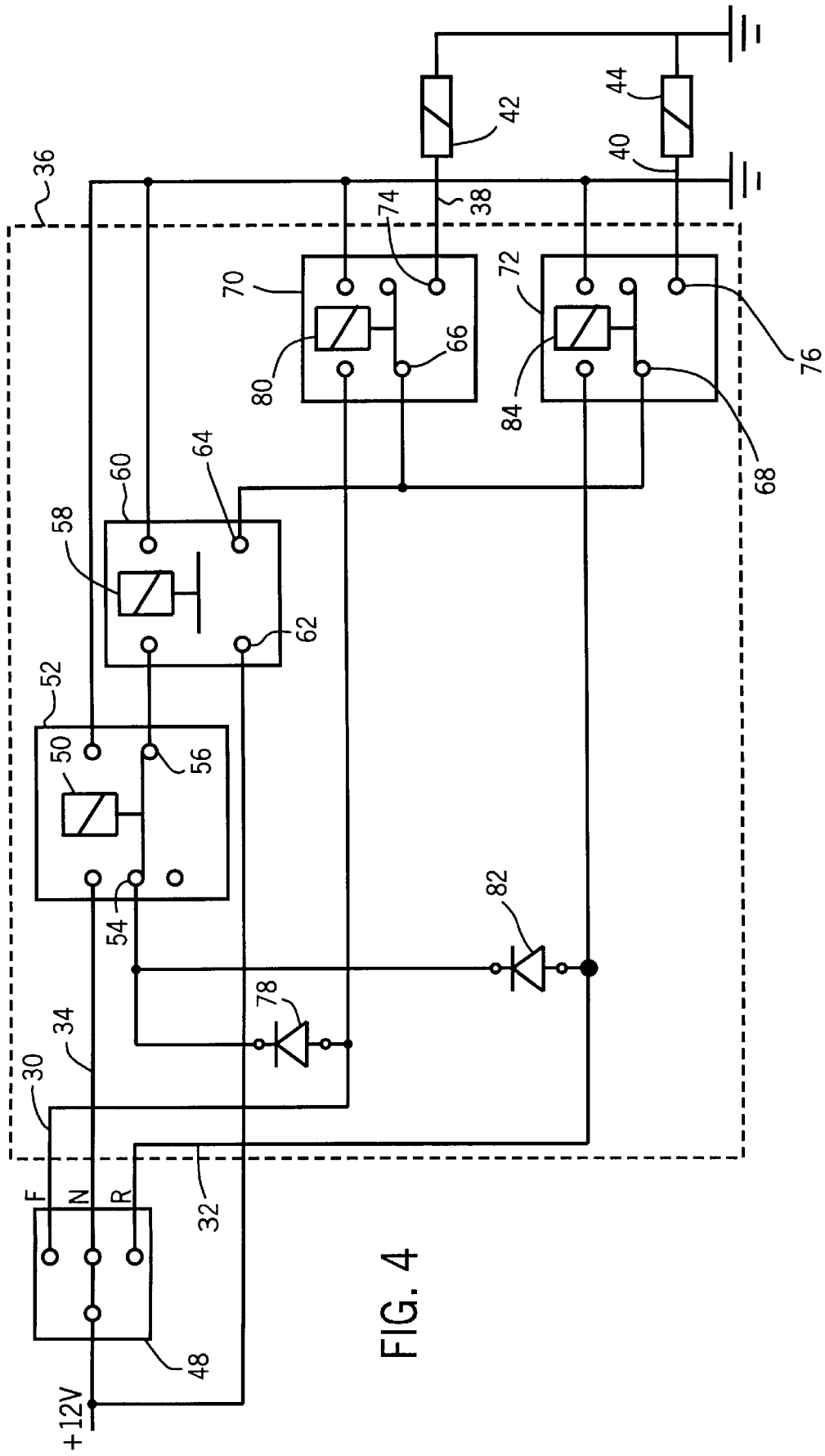
FIG. 4 is a circuit diagram of one embodiment of the transmission control circuit.

In FIG. 4, a preferred embodiment of the transmission control circuit is shown assembled from relays. All the relays in FIG. 4 are shown in their deenergized states. In this embodiment, the shuttle lever switch is a single pole, triple throw switch 48 that alternately couples the forward, reverse and neutral signal lines 30, 32 and 34 to a twelve volt power supply.

The Neutral Signal

The neutral signal line is connected to coil 50 of shuttle interlock relay 52. The other side of coil 50 is connected to ground. Whenever the neutral signal is applied to neutral signal line 34, shuttle interlock relay breaks the connection between contacts 54 and 56. When this connection is broken, current flow to coil 58 of shuttle interlock timing relay 60 is interrupted, and shuttle interlock timing relay 60 breaks the connection between contacts 62 and 64. When the connection between contacts 62 and 64 is broken, current flow to contacts 66 and 68 of forward relay 70 and reverse relay 72 is interrupted, thus interrupting any current flow to both the forward and reverse relay contacts and hence interrupts any power transmitted by these relays to either the forward or reverse transmission solenoids 42 and 44, respectively. The output of contacts 74 and 76 of forward relay 42 and reverse relay 44 are, respectively, the forward and reverse solenoid signals described above in conjunction with FIGS. 2 and 3. To summarize, whenever the neutral signal is generated by the shuttle shift lever 22 and switch 48, the forward and reverse solenoid signals are not generated, regardless of whether the shuttle shift lever 22 and switch 48 are concurrently generating forward or reverse signals.

In a preferred arrangement, the shuttle interlock timing relay 60 may be configured to have a delay of a few seconds after coil 58 is deenergized and before opening the connection between contacts 62 and 64. This delay is preferably between 3 and 10 seconds. This delay provides a brief period in which both the neutral signal and either the forward or reverse signal could be applied to the transmission control circuit 36 and during which period the transmission control circuit 36 would allow either forward or reverse operation, respectively. Operators often use engine braking to slow the vehicle by moving the shuttle shift lever 22 from forward to reverse and vice versa. By providing this brief delay before breaking the connection between shuttle interlock timing relay contacts 62 and 64, the operators would have a few seconds of vehicle braking before the forward and reverse solenoid signals were interrupted, causing the vehicle to shift into neutral.

The Forward Signal

The forward signal line is connected to the input of forward diode 78 as well as to one side of coil 80 of forward relay 70. The other side of coil 80 is connected to ground. Thus, whenever the forward signal is generated on the forward signal line, the coil of forward relay 70 is energized, making a connection between contacts 66 and 74 of forward relay 70.

At the same time, the forward signal is applied (via forward diode 78) to contact 54 of shuttle interlock relay 52, which, when deenergized, connects contact 54 to contact 56 of the shuttle interlock relay and thence to coil 58 of the shuttle interlock timing relay 60. Since the other side of coil 58 of shuttle interlock timing relay 60 is connected to ground, this causes the shuttle interlock timing relay to connect the twelve volt supply to contacts 66 and 68 of forward and reverse relays 70 and 72, respectively. Since coil 80 of forward relay 70 is also energized, the forward solenoid signal is provided on line 38 and is conducted to the forward transmission solenoid 42, thereby energizing the forward and reverse shift valve 24 in a forward position and engaging transmission 14 in a forward gear ratio.

The Reverse Signal

The reverse signal line is connected to the input of reverse diode 82 as well as to one side of coil 84 of reverse relay 72. The other side of coil 84 is connected to ground. Thus, whenever the reverse signal is generated on the reverse signal line 32, coil 84 of reverse relay 72 is energized, making a connection between contacts 68 and 76 of reverse relay 72.

At the same time, the reverse signal is applied (via reverse diode 82) to contact 54 of shuttle interlock relay 52, which, when deenergized, connects contact 54 to contact 56 of the shuttle interlock relay and thence to coil 58 of the shuttle interlock timing relay 60. Since the other side of coil 58 of shuttle interlock timing relay 60 is connected to ground, this causes the shuttle interlock timing relay to connect the twelve volt supply to contacts 66 and 68 of reverse and forward relays 72 and 70, respectively. Since coil 84 of reverse relay 72 is also energized, the reverse solenoid signal is generated on line 40 and is conducted to the reverse transmission solenoid, thereby energizing the forward and reverse shift valve 24 in a reverse position and thereby engaging transmission 14 in a reverse gear ratio.

Thus, it should be apparent that there has been provided in accordance with the present invention a directional control interlock circuit for loader/backhoes and loaders that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A work vehicle having an engine coupled to a transmission that includes a torque converter and a transmission shiftable into a forward direction by engaging a forward solenoid and a reverse direction by engaging a reverse solenoid, and an operator-actuable shuttle shift lever for generating forward, reverse and neutral signals indicative of a desired forward direction, reverse direction and a neutral transmission condition, respectively, the improvement comprising:

a transmission control circuit configured to engage the forward solenoid in response to the forward solenoid signal, the reverse solenoid in response to the reverse solenoid signal and to generate a neutral transmission condition in response to the neutral signal, and further configured to generate the neutral condition in response to concurrent receipt of both the neutral and the forward signals and the neutral and the reverse signals.

2. The improvement of claim 1, wherein upon concurrent receipt of the neutral signal and the forward signal, the transmission generates the neutral condition after a delay of between 3 and 10 seconds.

3. The improvement of claim 2, wherein upon concurrent receipt of the neutral signal and the reverse signal, the transmission control circuit generates the neutral condition after a delay of between 3 and 10 seconds.

4. The improvement of claim 1, wherein the transmission control circuit includes a shuttle interlock circuit that, on receipt of the neutral signal, interrupts power otherwise supplied to a forward solenoid.

5. The improvement of claim 4, wherein the transmission control circuit includes a shuttle interlock circuit that, on receipt of the neutral signal, interrupts power otherwise supplied to a reverse solenoid.

6. An improved work vehicle comprising:

a frame;

an engine coupled to the frame;

a transmission coupled to the engine engageable at least in forward, reverse and neutral;

a plurality of drive wheels coupled to the transmission;

a shuttle shift lever having at least a reverse, a forward and a neutral position;

a switch responsive to the position of the shuttle shift lever for generating a forward signal, a reverse signal and a neutral signal indicative of the forward, reverse and neutral positions of the shuttle shift lever; and a transmission control circuit coupled to the switch to receive the forward, reverse and neutral signals, and to engage the transmission in forward on receipt of the forward signal, to engage the transmission in reverse on receipt of the reverse signal, and to place the transmission in neutral on receipt of the neutral signal, and also to engage the transmission in neutral on concurrent receipt of the neutral and the forward signals and on concurrent receipt of both the neutral and reverse signals.

7. The work vehicle of claim 6, wherein upon concurrent receipt of the neutral signal and the forward signal, the transmission control circuit places the transmission in neutral after a delay of between 3 and 10 seconds.

8. The improvement of claim 7, wherein upon concurrent receipt of the neutral signal and the reverse signal, the transmission control circuit places the transmission in neutral after a delay of between 3 and 10 seconds.

9. The improvement of claim 6, wherein the transmission control circuit includes a shuttle interlock circuit that, on receipt of the neutral signal, interrupts power otherwise supplied to a forward transmission solenoid.

10. The improvement of claim 9, wherein the transmission control circuit includes a shuttle interlock circuit that, on receipt of the neutral signal, interrupts power otherwise supplied to a reverse transmission solenoid.

* * * * *